United States Patent [19]

de Sivry et al.

[11] 4,370,541
[45] Jan. 25, 1983

[54] ELECTRON BEAM CHAMBER FOR BUTT WELDING PIPES

[75] Inventors: Bruno de Sivry, Paris; Bernard Sudreau, Puteaux; Claude Carsac, St Leu la Foret; Jean-Pierre Hamon, Cergy; Michel Fuzeau, Parthenay, all of France

[73] Assignee: Compagnie Francaise des Petroles, Paris, France

[21] Appl. No.: 256,171

[22] Filed: Apr. 21, 1981

[30] Foreign Application Priority Data

Apr. 25, 1980 [FR] France ................. 80 09343

[51] Int. Cl.³ .............................. B23K 15/00
[52] U.S. Cl. .................. 219/121 EC; 219/121 EN; 219/121 EX
[58] Field of Search ................. 219/121 ED, 121 EC, 219/121 EL, 121 EN, 121 EX, 121 EV, 121 EZ

[56] References Cited

FOREIGN PATENT DOCUMENTS 2919813 11/1979 Fed. Rep. of Germany ...... 219/121 EN

Primary Examiner—C. L. Albritton
Attorney, Agent, or Firm—Sughrue, Mion, Zinn, Macpeak and Seas

[57] ABSTRACT

An electron beam welding chamber for butt joining elongate members 1,2 extending longitudinally at the center of the chamber. The chamber comprises an envelope 7 defining the welding enclosure 6 and which rests on a fixed structure 8. The electron gun equipment 13 is provided within the envelope and is mechanically connected, by a withdrawable connection means 18 or by elastic connection means 24, 25, to the enclosure, clamping means 15 being provided for clamping the electron gun equipment relative to one of the elongate members. This invention is particularly applicable to the welding of the sections of a pipe to be laid on the sea bed.

9 Claims, 3 Drawing Figures

ELECTRON BEAM CHAMBER FOR BUTT WELDING PIPES

The present invention relates to an electron beam welding chamber intended for use in the butt joining of two elongate members which extend in their longitudinal direction at the centre of the welding chamber. Electron beam welding has advantages because it is suitable for members of high thickness, because it permits rapid and automated welding operations and because it does not require a heat treatment, but it requires the installation of a leak-tight envelope for creating the essential vacuum, which envelope must also protect the external environment against the X-rays emitted during the impact of the electron beam on the members to be welded, and the attainment of a high degree of precision in the position of the electron gun or guns, relative to the plane of unknown orientation for joining the two members, which members can move relative to the envelope.

These two conditions are difficult to satisfy conjointly because the positioning of the electron gun or guns is rendered difficult by the large mass of the assembly comprising the envelope, the electron gun and the equipment for supporting, positioning and displacing the latter, and by the deformation of the envelope under the effect of the vacuum.

According to the invention there is provided an electron beam welding chamber for use in the butt joining of two elongate members which extend in their longitudinal direction at the centre of the welding chamber, comprising at least one electron gun, equipment for supporting, positioning and displacing the or each said electron gun, clamping means for gripping a first elongate member to which a second elongate member is to be butt welded, an envelope defining an enclosure containing said or each said electron gun and said associated equipment, retractable sealing means provided at the longitudinal ends of said enclosure for sealing against the respective first and second elongate members, and means for creating a vacuum in said enclosure, wherein said equipment is connected to said envelope by mechanical connection means which permit, at least in one position of said connection means, relative displacement of said equipment and said envelope, such that with said envelope resting on a fixed structure, said equipment is rigidly connectable relative to the first elongate member by said clamping means.

Thus, during a welding operation, the welding equipment can be mounted directly on the first elongate member without it being necessary simultaneously to displace the envelope and without being hindered by deformation of the latter, because it is not involved in the connection between the equipment and the first elongate member.

Apart from during the actual welding operations, when the elongate members must be displaced, the equipment is separated from the members and it is held, by its mechanical connection to the envelope, in a position which does not have to be very precise.

The mechanical connection means can be either withdrawable rigid connection means or elastic connection means.

In the latter case, the elastic connection means are advantageously pneumatic jacks and these are preferably arranged so that some of them act in the longitudinal direction and the others in the transverse direction.

These jacks are preferably adjustable and associated with stroke-measuring sensors which control their adjustment.

Other features of the invention will become apparent from the description of embodiments thereof, given by way of example only with reference to the accompanying drawings. In the drawings.

Figure 1:
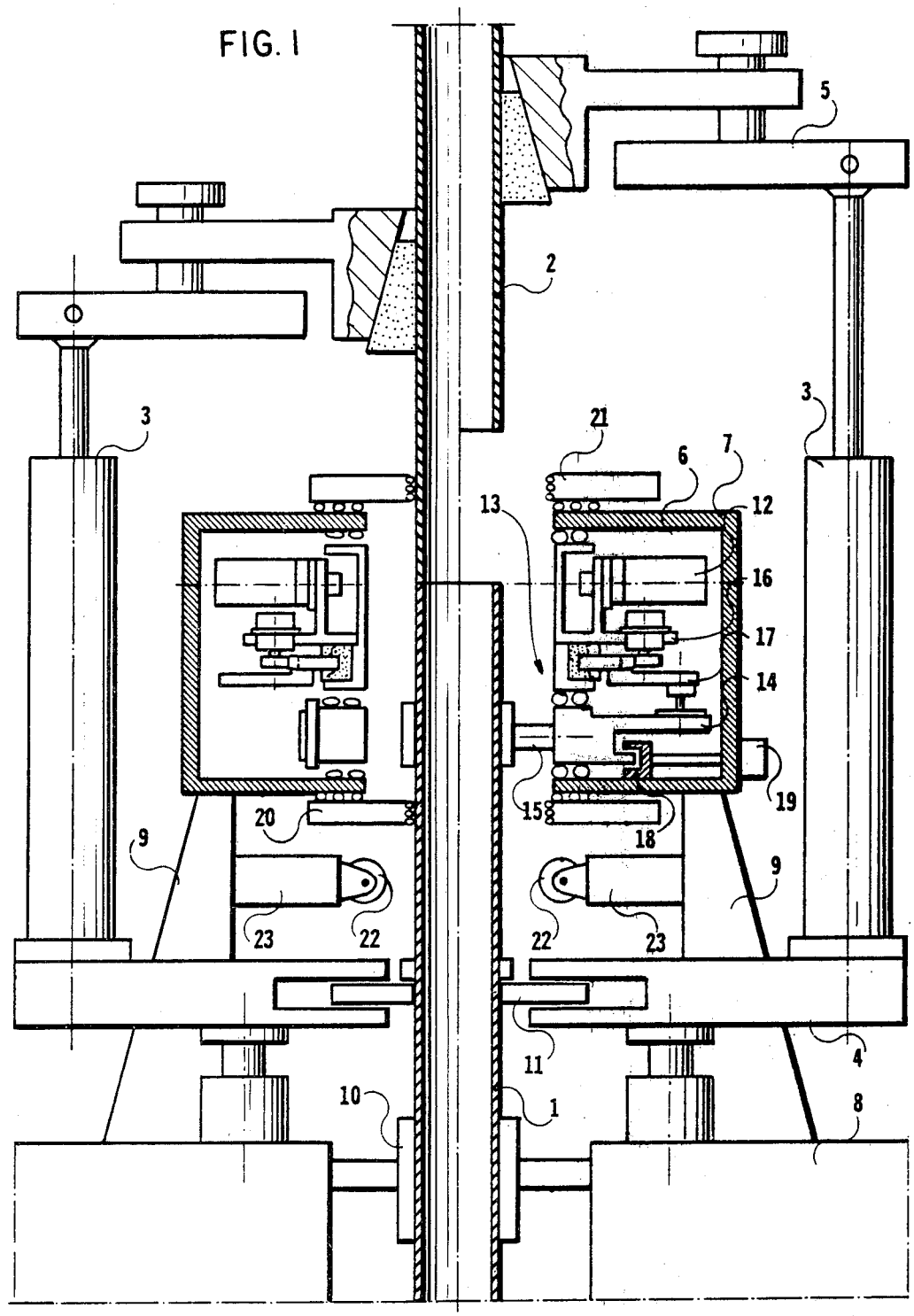
FIG. 1 shows a first embodiment of a welding chamber in longitudinal section.

The welding chambers shown in the drawing are intended for use in welding the sections of a pipe for conveying hydrocarbons, and particularly during the laying of pipes in the sea, and more particularly during so-called "J-laying", in which the pipe sections to be welded are vertical or only slightly inclined relative to the vertical, but it will be understood that analogous arrangements of welding chambers are also suitable for the welding, on land or in the sea, of any elongate pieces extending at any inclination.

In FIG. 1, a first elongate piece or a first pipe section 1 is to receive, at its upper end, a second elongate piece or a second pipe section 2, which is shown, in the right-hand part of the figure, at a distance from the section 1, and, in the left-hand part of the figure, close to the section 1. The two sections are brought closer together by means of jacks 3 connected to cross bars 4 and 5 which are fixed to a respective one of the pipe sections. The two sections are connected by electron beam welding carried out inside a welding chamber defining an enclosure 6 delimited by an envelope 7 which rests on a fixed structure 8 by connection feet 9. The section 1 is held relative to the fixed structure 8 by a clamp 10 and a flange 11 supported by a movable apparatus.

Inside the enclosure 6, two electron guns 12 are provided, each of which rotates around the pipe sections, and associated equipment 13 for supporting, positioning and displacing the guns, which comprises, in particular, a support ring 14 provided with arms 15 for clamping the pipe section 1, a gun-carrying sleeve 16, an intermediate plate 17 of adjustable inclination, and various mechanisms which are of no direct interest to the present invention.

The envelope 7 carries open clamps 18 which can be radially displaced under the action of jacks 19 so as to attach the ring 14 to the envelope 7 and to free the ring 14.

The leaktightness of the enclosure 6 is ensured by retractable gaskets 20 and 21, for example inflatable gaskets, which grip and seal against the pipe sections 1 and 2 respectively. An internal sealing device, which is not shown, is introduced into the pipe sections 1 and 2 in order to isolate the zone to be welded. A vacuum is created in the enclosure 6 by pumping means which have not been shown because they are conventional.

Wheels 22, mounted on arms 23 carried by the feet 9, limit the lateral movement of the pipe sections.

During the actual welding operation, the gaskets 20 and 21 are closed around and seal against the pipe sections, and the arms 15 grip the pipe section 1 tightly, whilst the clamps 18 are radially separated to free the equipment 13, which is thus firmly connected to the pipe section 1, from the envelope 7. During longitudinal displacement of the pipe sections, the clamps 18 are brought radially closer together to connect the equipment 13 and the envelope 7, whilst the arms 15 are released and the gaskets 20 and 21 are retracted.

Figure 2:
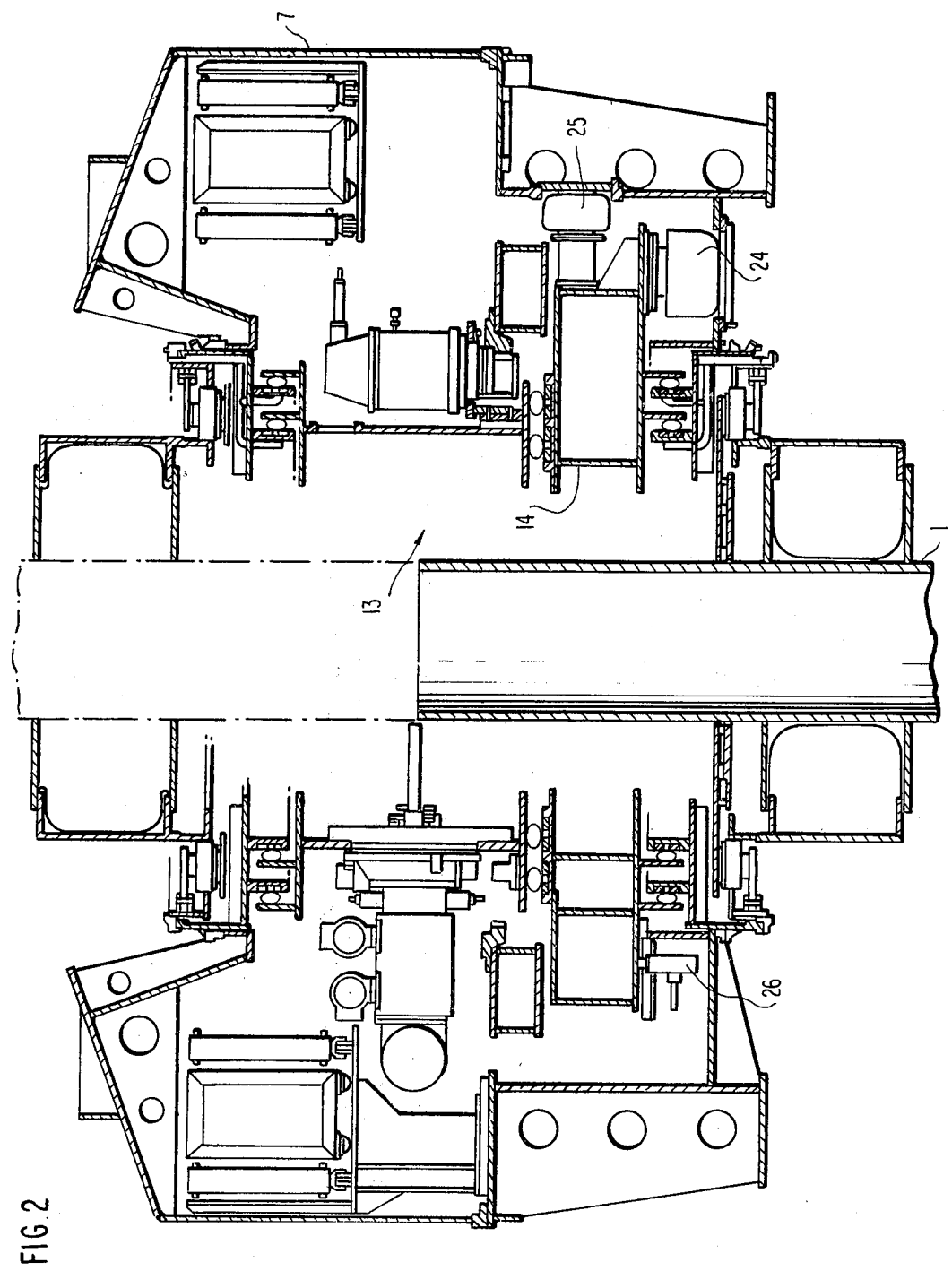
FIG. 2 shows a second embodiment of a welding chamber in longitudinal section.
Figure 3:
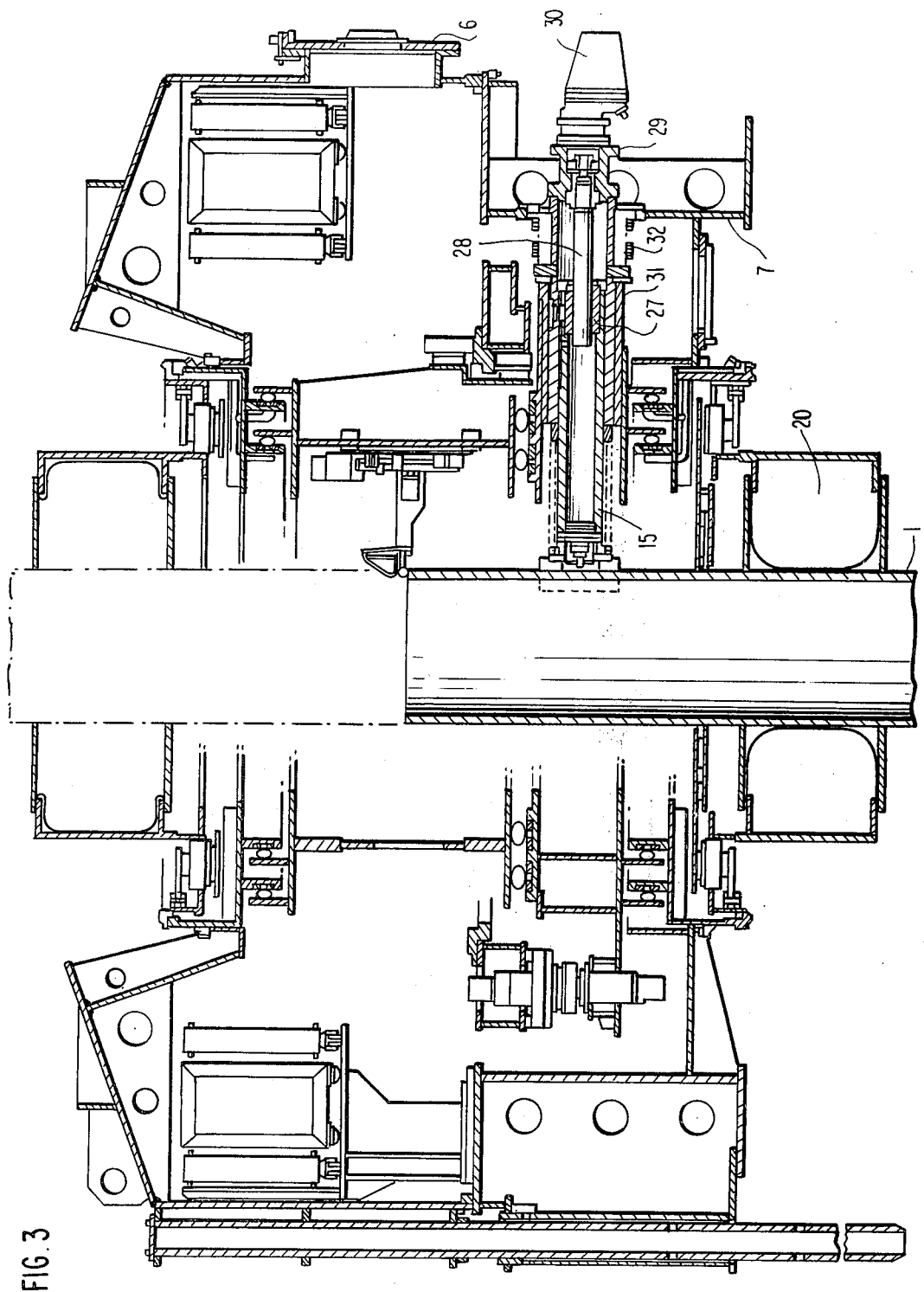
FIG. 3 shows another longitudinal section of the welding chamber of the second embodiment.

FIGS. 2 and 3 show, very schematically, only the welding chamber, its support means and the means for bringing the pipe sections to be butt welded closer together having been excluded, of two further embodiments.

The embodiment of FIG. 2 shows another embodiment of the mechanical connection means between the equipment 13 and the envelope 7. These means comprise rubber pneumatic jacks 24 acting in the longitudinal direction and rubber pneumatic jacks 25 acting in the transverse direction. The pneumatic jacks 24 support the weight of the equipment 13, whilst the jacks 25 compensate for the component of force created by the inclination of the welding machine and the action of the swell on the vessel carrying the chamber.

These jacks have an adjustable internal pressure and are connected to a power unit, which is not shown, for supplying and automatically regulating the pressure of compressed gas, which makes it possible to supply the jacks with the appropriate pressures during the various operating phases, so as to obtain the desired partial or total compensations of forces. In particular, the power unit for supplying compressed gas can be controlled according to the information provided by sensors 26, which detect the displacement stroke of the equipment 13 relative to the envelope 7.

The force of these jacks is thus easily adjustable. It stays at a virtually constant value over a large stroke. Moreover, at one of the ends of their stroke, the force to be exerted by each jack increases considerably for a very slight increase in the stroke, this being an important characteristic for effectively limiting the movement of the equipment 13 inside the envelope 7.

FIG. 3 shows an embodiment of the mechanism for displacing the clamping arms 15. Each of the latter comprises a mechanical jack consisting of a nut 27 which engages with a screw 28, the latter being caused to rotate, via a transmission mechanism 29, by a stepping motor, hydraulic motor, electric motor or the like, 30. This motor may be placed inside the envelope 7 without being connected to the latter, and the transmission 29 can then be rigid. Alternatively, the motor 30 is placed outside the envelope and fixed to the latter, the transmission 29 comprising a universal joint system. Alternatively, as shown in FIG. 3, the motor may be fixed to a support or sheath 31 surrounding the clamping arm, which sheath is joined to the envelope 7 by a sealing bellows 32, it then being possible for the transmission to be rigid. In this embodiment all of the drive mechanism of the clamping arms 15 is located outside the vacuum enclosure.

Of course, the embodiments which have been described with reference to the drawing in no way imply a limitation, it being possible for them to form the subject of numerous modifications without going outside the scope of the invention.

What is claimed is:

1. An electron beam welding chamber for use in the butt joining of two elongate pipes which coaxially extend in their longitudinal directions at a center of the welding chamber, comprising: at least one electron gun (12), mounting equipment means (13) for supporting, positioning and displacing said electron gun in direct relation to a butt joint to be welded between two pipes, said mounting equipment means including clamping means (15) for directly gripping a first elongate pipe (1) to which a second elongate pipe (2) is to be butt welded, an envelope (7) defining an enclosure (6) surrounding and interiorly containing said electron gun and associated mounting equipment means, a fixed structure coupled to and supporting said envelope, retractable, spaced sealing means (20, 21) individually provided at opposite longitudinal ends of said enclosure for sealing against the respective first and second pipes, said clamping means being disposed within said envelope and enclosure and between said spaced sealing means, means for creating a vacuum in said enclosure, and mechanical means (18,19; 24,25) for selectively connecting said mounting equipment means to said envelope to enable, in one position of said mechanical connection means, relative displacement between said mounting equipment means and said envelope such that with said envelope resting on said fixed structure, said mounting equipment means is rigidly connectable to the first elongate pipe by said clamping means.

2. A chamber according to claim 1, wherein said mechanical connection means comprise withdrawable rigid connection means.

3. A chamber according to claim 1, wherein said mechanical connection means comprise elastic connection means.

4. A chamber according to claim 3, wherein said elastic connection means comprise pneumatic jacks.

5. A chamber according to claim 4, wherein said pneumatic jacks comprise jacks acting in the longitudinal direction and jacks acting in the transverse direction.

6. A chamber according to claim 4 or claim 5, wherein said pneumatic jacks are adapted to apply an adjustable force.

7. A chamber according to claim 6, wherein said jacks are associated with stroke-measuring sensors for controlling the adjustment of said jacks.

8. A chamber according to claim 1 wherein said clamping means are connected to be driven by motors, mounted on said envelope and outside said envelope, by means of a transmission mechanism with a universal joint system.

9. A chamber according to claim 1 wherein said clamping means are connected to be driven by motors which are arranged, with transmission mechanisms, outside said envelope and are fixed to supports which are connected to said envelope by bellows.

* * * * *